United States Patent
Kwak

(10) Patent No.: US 7,636,429 B2
(45) Date of Patent: Dec. 22, 2009

(54) PROVIDING CALL BACKUP OF VOICE OVER INTERNET PROTOCOL (VOIP) TERMINAL

(75) Inventor: Jae-Hwan Kwak, Suwon-si (KR)

(73) Assignee: Samsung Electronics Co., Ltd., Maetan-dong Yeongtong-gu, Suwon-si, Gyeonggi-do (KR)

( * ) Notice: Subject to any disclaimer, the term of this patent is extended or adjusted under 35 U.S.C. 154(b) by 1068 days.

(21) Appl. No.: 11/002,220

(22) Filed: Dec. 3, 2004

(65) Prior Publication Data
US 2005/0169250 A1 Aug. 4, 2005

(30) Foreign Application Priority Data
Feb. 2, 2004 (KR) ............... 10-2004-0006792

(51) Int. Cl.
 *H04M 3/42* (2006.01)
(52) U.S. Cl. .................. 379/207.06; 379/29.07; 379/207.07; 379/207.08; 379/418; 379/424; 379/448; 370/352
(58) Field of Classification Search ........... 370/352; 379/29.07, 207.02, 207.04–207.1, 418, 424, 379/425, 448
See application file for complete search history.

(56) References Cited
U.S. PATENT DOCUMENTS
6,614,786 B1 * 9/2003 Byers .................. 370/353

| 2001/0024440 | A1 | 9/2001 | Pounds et al. |
| 2003/0012184 | A1 | 1/2003 | Walker, III et al. |
| 2004/0022237 | A1 | 2/2004 | Elliott et al. |
| 2004/0037219 | A1 | 2/2004 | Shaffer et al. |
| 2004/0037265 | A1* | 2/2004 | Huang et al. ............ 370/352 |
| 2004/0052242 | A1 | 3/2004 | Laturell |
| 2004/0052350 | A1 | 3/2004 | Jaroker |
| 2005/0053051 | A1* | 3/2005 | Beyda et al. ............ 370/351 |

FOREIGN PATENT DOCUMENTS

| JP | 9-65429 | 3/1997 |
| JP | 2001-217929 | 8/2001 |
| JP | 2004-15755 | 1/2004 |

OTHER PUBLICATIONS

Japanese Office Action corresponding to Japanese Patent Application No. 2005-024949, issued on Dec. 19, 2006.

* cited by examiner

*Primary Examiner*—MD S Elahee
(74) *Attorney, Agent, or Firm*—Robert E. Bushnell, Esq.

(57) ABSTRACT

In providing call backup of a VoIP terminal, where the VoIP terminal connected to a VoIP network is automatically provided with a PSTN backup function, the on the hook state is deferred for a predetermined time period even when the on the hook state is required to be performed while a user makes an urgent communication, and a ring tone signal transmitted from a PSTN can be detected even when the telephone connected to the VoIP terminal is in a VoIP mode state. Simultaneously, the telephone connected to the VoIP terminal senses the hook state of the telephone in the state of the PSTN, and can be automatically connected to the VoIP network upon the VoIP terminal being on the hook.

20 Claims, 9 Drawing Sheets

FIG. 5

| | | | |
|---|---|---|---|
| pktcSigTosFormatSelector | .1.3.6.1.4.1.4491.2.2.2.1.1.... | 1 | int |
| fujikuraMtaPrivToneEnabled | .1.3.6.1.4.1.236.11.1.11.22... | 1 | int |
| fujikuraMtaRxGain | .1.3.6.1.4.1.236.11.1.11.22... | 0 | int |
| fujikuraMtaTxGain | .1.3.6.1.4.1.236.11.1.11.22... | 0 | int |
| fujikuraMtaPbEnabled | .1.3.6.1.4.1.236.11.1.11.22... | 1 | int |
| fujikuraMtaFullSDPEnabled | .1.3.6.1.4.1.236.11.1.11.22... | 1 | int |
| fujikuraMtaDPmode | .1.3.6.1.4.1.236.11.1.11.22... | 30 | int |
| fujikuraMtaFQDNEnabled | .1.3.6.1.4.1.236.11.1.11.22... | 1 | int |
| fujikuraMtaPQoSMode | .1.3.6.1.4.1.236.11.1.11.22... | 1 | int |
| fujikuraMtaUGSADMode | .1.3.6.1.4.1.236.11.1.11.22... | 2 | int |
| fujikuraMtaRTPSECMode | .1.3.6.1.4.1.236.11.1.11.22... | 1 | int |
| fujikuraMtaROBusyToneEnabled | .1.3.6.1.4.1.236.11.1.11.22... | 1 | int |
| fujikuraMtaPSTNSwitchingEnabled | .1.3.6.1.4.1.236.11.1.11.22... | 1 | int |
| fujikuraMtaPSTNSwitchingAlarmEnabled | .1.3.6.1.4.1.236.11.1.11.22... | 1 | int |
| fujikuraMtaPSTNPrefix | .1.3.6.1.4.1.236.11.1.11.22... | #I0000 | string |
| fujikuraMtaPSTNEmergencyCallNum | .1.3.6.1.4.1.236.11.1.11.22... | 110I112I113 | string |
| fujikuraMtaPSTNSpecialCallNum | .1.3.6.1.4.1.236.11.1.11.22... | 1xxI116 | string |
| fujikuraMtaPSTNCallWaitingEnabled | .1.3.6.1.4.1.236.11.1.11.22... | 1 | int |
| pktcSigDevRgCadence | .1.3.6.1.4.1.4491.2.2.2.1..... | ff00ff00ff00ff00 | octetstring | a, b, c labels indicated on fujikuraMtaPSTNPrefix, fujikuraMtaPSTNEmergencyCallNum, fujikuraMtaPSTNSpecialCallNum rows.

R bracket spans fujikuraMtaPSTNSwitchingEnabled through fujikuraMtaPSTNCallWaitingEnabled.

PROVIDING CALL BACKUP OF VOICE OVER INTERNET PROTOCOL (VOIP) TERMINAL

CLAIM OF PRIORITY

This application makes reference to, incorporates the same herein, and claims all benefits accruing under 35 U.S.C. §119 from an application for APPARATUS AND METHOD FOR PROVIDING CALL BACKUP OF VoIP TERMINAL earlier filed in the Korean Intellectual Property Office on 2, Feb., 2004 and there duly assigned Serial No. 2004-6792.

BACKGROUND OF THE INVENTION

1. Field of the Invention

The present invention relates to providing call backup of a Voice over Internet Protocol (VoIP) terminal and, more particularly, the present invention relates to providing call backup of a VoIP terminal, where a Public Switched Telephone Network (PSTN) backup function of the VoIP terminal connected to a VoIP network is enhanced so that better service can be provided to users.

2. Description of the Related Art In a VoIP network providing a general PSTN backup function, a VoIP mode of a telephone connected to the VoIP terminal is first set.

Next, the VoIP terminal determines whether or not a mode selection signal has been received from the telephone by selecting a specific button of the telephone set by a user.

The specific button is defined in a configuration file downloaded from the OSS when the VoIP terminal is connected to the VoIP network.

As a result of the determination, the VoIP terminal operates a relay switch to directly connect the telephone to the Switching Center through the PSTN to set the PSTN mode when the mode selection signal has been received from the telephone.

The Switching Center determines whether or not an incoming signal in accordance with the user's selection has been transmitted from the telephone. When the incoming signal has been received, the Switching Center identifies an incoming phone terminal and connects a call to effect voice communication between the corresponding incoming telephone terminal and the telephone connected to the VoIP terminal.

The VoIP terminal determines whether or not the telephone or the incoming telephone terminal is on the hook when the user hangs up, and sets the VoIP mode in which the telephone is connected to the VoIP network when the VoIP terminal is on the hook.

However, the above-noted method where the VoIP terminal provides the PSTN back up function has the following problems.

Firstly, the user cannot be automatically provided with the information message service and urgent communication service from the Switching Center through the telephone connected to the VoIP terminal.

That is, the VoIP terminal operates the relay switch and connects the telephone to the Switching Center only when the user selects a specific button and a mode selection signal is transmitted from the telephone.

When the VoIP terminal connects the telephone to the Switching Center, the Switching Center recognizes that the telephone is off the hook and transmits a dial tone.

Accordingly, there are problems in that the user has to listen for the dial tone transmitted from the Switching Center, again select a button which is used to request the information message service or the urgent communication service, and retransmit the request signal to the Switching Center.

Secondly, there is no function provided where the on the hook state is deferred for a predetermined time period in case an unexpected problem broke out while an urgent call requested by the user is made so that it is mandatory that the telephone be on the hook.

For example, it is required that even though the user necessarily leaves the telephone on the hook due to an unexpected reason while the user makes an urgent call, for example, a crime report, the VoIP terminal defers the on the hook state for a predetermined time period so that the Switching Center or the incoming party can grasp the state of the user. However, conventional methods did not consider the above.

Thirdly, the VoIP terminal cannot detect a ring tone signal transmitted from the Switching Center while the VoIP mode is set where the telephone is connected to the VoIP network.

Accordingly, there is a problem that the PSTN line cannot be used while the VoIP is setting the VoIP mode.

Finally, in the PSTN mode where the VoIP terminal connects the telephone 91 to the PSTN in accordance with the user's selection, it is not possible to sense a state of the usage of the telephone, that is, the on the hook or off the hook state of the telephone.

The following patents each discloses features in common with the present invention but do not teach or suggest the inventive features specifically recited in the present application: U.S. Patent Application No. 2004/0022237 to Ellliott et al., entitled VOICE OVER DATA TELECOMMUNICATIONS NETWORK ARCHITECTURE, published on Feb. 5, 2004; U.S. Patent Application No. 2001/0024440 to Pounds et al., entitled SYSTEMS AND METHODS FOR MULTIPLE MODE VOICE AND DA TA COMMUNICATIONS HAVING INTELLIGENTLY BRIDGED TDM AND PACKET BUSES AND TELEPHONY STATION CARDS INCLUDING VOLTAGE GENERATIORS, published on Sep. 27, 2001; U.S. Patent Application No. 2003/0012184 to Walker III et al., entitled INTEGRATED ACCESS DEVICE, published on Jan. 16, 2003; U.S. Patent Application No. 2004/0052242 to Laturell, entitled POTS/BROADBAND VOICE CROSS-CONNECT SYSTEM, published on Mar. 18, 2004; U.S. Patent Application No. 2004/0037219 to Shaffer et al., entitled SYSTEM AND METHOD FOR PROVIDING FAULT TOLERANT IP SERVICES, published on Feb. 26, 2004; and U.S. Patent Application No. 2004/0052350 to Jaroker, entitled SYSTEM AND METHOD FOR DELIVERING ENHANCED VOICE AND DATA SERVICES IN PARALLEL WITH AN INCUMBENT PHONE COMPANY, published on Mar. 18, 2004.

SUMMARY OF THE INVENTION

It is an object of the present invention to provide call backup of a VoIP terminal, where an automatic backup function is provided in the VoIP terminal connected to a VoIP network, the on the hook state is deferred for a predetermined time period even in when the on the hook state is compulsorily performed while a user makes urgent communication, and a ring tone signal transmitted from a PSTN can be detected even when the telephone connected to the VoIP terminal is connected to the VoIP network.

It is another object of the present invention to provide call backup of a VoIP terminal, where the VoIP terminal senses the hook state when the VoIP terminal is connected to a PSTN, and can be automatically connected to a VoIP network when the VoIP terminal is on the hook.

According to an aspect of the present invention, a Voice over Internet Protocol (VoIP) terminal is provided comprising: a line interface unit adapted to interface a line connected to a telephone terminal; an audio processing unit adapted to convert and process a signal switched between the telephone terminal connected through the line interface unit and a VoIP network; a mode setting unit adapted to provide a request signal transmitted from the telephone terminal, a mode change signal in accordance with a communication state of a line connected to a Public Switched Telephone Network (PSTN), and a dial control signal to generate a communication request signal in accordance with the type of request signal; a PSTN circuit unit adapted to provide a communication termination sensing signal in accordance with the communication state of the line connected to the PSTN, to generate the communication request signal in accordance with the dial control signal from the mode setting unit and to transmit the request signal to the PSTN; a first switching unit adapted to connect the audio processing unit to one of the line interface unit and the PSTN circuit unit in accordance with the mode change signal from the mode setting unit; and a second switching unit adapted to connect the line connected to the telephone terminal to one of the line interface unit and the PSTN in accordance with the mode change signal from the mode setting unit.

The VoIP terminal can further comprise: a port unit adapted to connect the telephone terminal to one of the line interface unit and the PSTN through the telephone line; and a signal processing unit adapted to extract regular signals from signals transmitted from one of the telephone terminal and the VoIP network.

The port unit can comprise at least one Registered Jack (RJ) and the signal processing unit can comprise a Digital Signal Processing (DSP) processor.

Preferably, the mode setting unit is adapted to determine whether a request signal transmitted from the telephone terminal is a mechanical request signal or an electronic request signal in accordance with a receiving time, and to generate the dial control signal in accordance with the determined type of request signal.

The PSTN circuit unit can comprise a third switching unit adapted to enable a Switching Center to sense the communication request signal by connecting a line to the Switching Center via the PSTN in accordance with whether the dial control signal is ON or OFF.

Preferably, the communication request signal generated by the PSTN circuit unit comprises a Dual-Tone Multi-Frequency (DTMF) signal.

Preferably, the mode setting unit is adapted to provide a switching control signal to control the first switching unit, to transmit a dial control signal to the PSTN circuit unit, and to provide a switching control signal to control the second switching unit, upon the request signal being transmitted from the telephone terminal.

Preferably, the mode setting unit is adapted to determine whether or not the request signal transmitted from the telephone terminal is an urgent communication request signal upon a communication termination sensing signal being transmitted from the PSTN circuit unit, and to delay the communication termination state of the line for a predetermined time period upon the request signal being an urgent communication request signal.

Preferably, the audio processing unit is adapted to transform a digital signal transmitted from the VoIP network to an analog signal and to transmit the transformed analog signal to the telephone terminal via the line interface unit.

Preferably, the audio processing unit comprises at least one Subscriber Line Audio-Processing Circuit (SLAC).

Preferably, the mode setting unit is adapted to provide the first switching control signal connecting the telephone terminal to the VoIP network upon the telephone terminal being connected through the port unit, and the second switching control signal connecting the telephone terminal to the PSTN upon a mode selection signal being transmitted from the telephone terminal.

Preferably, the first switching unit is adapted to connect the audio processing unit to the line interface unit upon the first switching control signal being provided from the mode setting unit and to connect the audio processing unit to the PSTN circuit unit upon the second switching control signal being provided.

Preferably, the second switching unit is adapted to connect the port unit to the line interface unit upon the first switching control unit being provided from the mode setting unit and to connect the port unit to the PSTN circuit unit upon the second switching control signal being provided.

Preferably, the first and second switching units comprise relay switches.

Preferably, the mode setting unit is adapted to provide the first switching control signal and to connect the telephone terminal to the PSTN upon the mode selection signal being transmitted from the telephone terminal and the communication sensing signal being transmitted from the PSTN circuit and the telephone terminal being connected to the VoIP network.

According to another aspect of the present invention, a Voice over Internet Protocol (VoIP) terminal is provided comprising: a line interface unit adapted to interface a line connected to a telephone terminal; an audio processing unit adapted to process and convert an analog signal transmitted from the telephone terminal via the line interface unit into a digital signal; a Public Switched Telephone Network (PSTN) circuit unit adapted to provide a ring tone detection signal by detecting a communication termination sensing signal in accordance with a communication state of a line connected to a PSTN and a ring tone signal transmitted from the PSTN; a mode setting unit adapted to provide a PSTN switching control signal connecting the PSTN to the telephone terminal upon the ring tone detection signal being provided by the PSTN circuit, and to provide a VoIP switching control signal upon the communication termination sensing signal being provided; a first switching unit adapted to connect the audio processing unit to the PSTN circuit unit in accordance with a PSTN switching control signal provided by the mode setting unit, and to connect the audio control unit to the line interface unit in accordance with the VoIP switching control signal; and a second switching unit adapted to connect the telephone terminal to the PSTN in accordance with the PSTN switching control signal provided by the mode setting unit, to transmit the ring tone signal to the telephone terminal, and to connect the telephone terminal to the line interface unit in accordance with the VoIP switching control signal.

The VoIP terminal can further comprise: a port unit adapted to connect the telephone terminal to the line interface unit and the PSTN via a telephone line; and a signal processing unit adapted to extract regular signals from signals transmitted from one of the telephone terminal and the VoIP network.

Preferably, the PSTN circuit unit is adapted to provide the ring tone detection signal to the mode setting unit upon the ring tone detection signal being detected via the line connected to the PSTN in a VoIP mode state wherein the mode setting unit is adapted to connect the telephone terminal to the VoIP network.

According to another aspect of the present invention, a method is provided comprising: connecting a telephone terminal via a telephone line to a Voice over Internet Protocol (VoIP) network; transmitting a communication request signal including telephone number information transmitted from the telephone terminal in accordance with a subscriber's selection to a Switching Center via a Public Switched Telephone Network (PSTN); connecting the telephone terminal to the Switching Center via the PSTN; sensing a communication state of a communication call upon the telephone terminal setting the communication call to exchange a voice signal via the PSTN; and connecting the telephone terminal to the VoIP network upon the communication state being terminated.

The method can further comprise: sensing whether or not a ring tone signal has been received via the PSTN upon the telephone terminal being connected to the VoIP network; and connecting the telephone terminal to the PSTN upon the ring tone signal being received.

The method can further comprise: determining whether or not the telephone number information included in the communication request signal transmitted from the telephone terminal is urgent communication number information upon the communication call set in the telephone terminal being in a communication termination state; and deferring the communication termination state of the telephone terminal for a predetermined time period upon the telephone number information being determined to be the urgent communication number information.

Preferably, transmitting the communication request signal includes determining if the communication request signal transmitted from the telephone terminal is a mechanical signal or an electronic signal, and includes controlling connection of the communication line connected to the PSTN and transmitting the communication request signal upon the communication request signal being a mechanical signal, and transmitting a Dial Tone Multi Frequency (DTMF) communication request signal upon the communication request signal being an electronic signal.

According to yet another aspect of the present invention, a method is provided comprising: setting a Voice over Internet Protocol (VoIP) mode to connect a telephone terminal to a VoIP network; enabling a line sensing apparatus to provide a ring tone detection signal upon a ring tone signal being transmitted from a Public Switched Telephone Network (PSTN) upon the VoIP mode being set; and setting a PSTN mode to connect the telephone terminal to the PSTN upon the ring tone detection signal being provided.

The method can further comprise: enabling a call to be connected between the telephone terminal and an outgoing telephone terminal via the PSTN by enabling the telephone terminal to respond to the ring tone signal transmitted to the PSTN; enabling the line sensing apparatus to provide a communication termination sensing signal in accordance with a communication state of the line upon the PSTN mode being set; and releasing the PSTN mode and setting the VoIP mode upon the communication termination sensing signal being sensed by the line sensing apparatus.

According to still another aspect of the present invention, a method is provided comprising: setting a Voice over Internet Protocol (VoIP) mode to connect a telephone terminal to a VoIP network upon the telephone terminal being connected; transmitting a communication request signal to a Public Switched Telephone Network (PSTN) upon the communication request signal being transmitted from the telephone terminal; setting a PSTN mode connecting the telephone terminal to the PSTN, and sensing a communication state of a line connected to the telephone terminal and the PSTN; and releasing the PSTN mode and setting the VoIP mode upon the communication state of the line being in a communication termination state.

BRIEF DESCRIPTION OF THE DRAWINGS

A more complete appreciation of the present invention, and many of the attendant advantages thereof, will be readily as the same becomes better understood by reference to the following detailed description when considered in conjunction with the accompanying drawings in which like reference symbols indicate the same or similar components, wherein:

FIG. 5 is a view of a configuration file in accordance with an embodiment of the present invention;

DETAILED DESCRIPTION OF THE INVENTION

Figure 1:
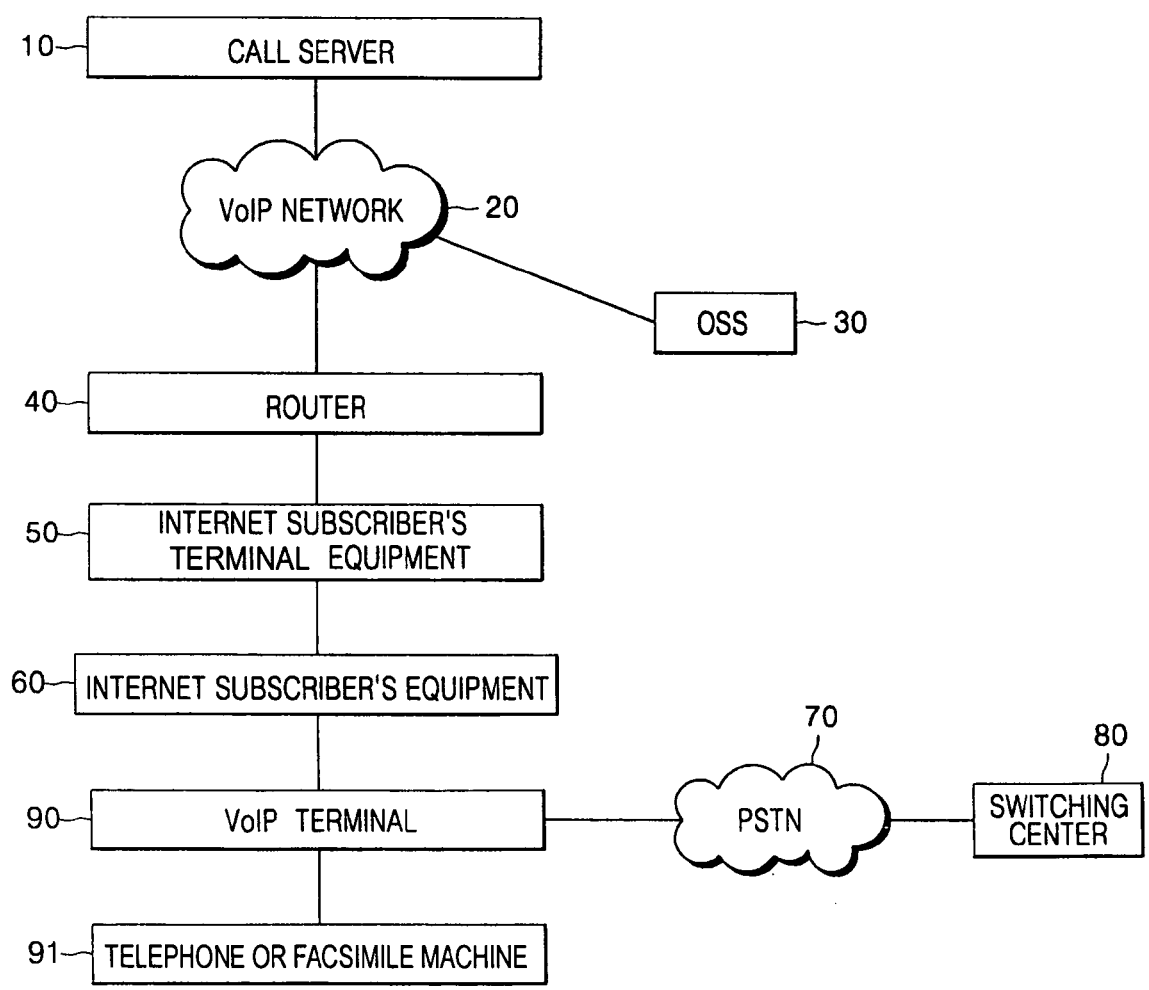
FIG. 1 is a block diagram of a VoIP network having a PSTN backup function.

FIG. 1 is a block diagram of a VoIP network providing a general PSTN backup function.

Referring to FIG. 1, A VoIP network providing a PSTN backup function includes a call server 10, an Operation Support Server (OSS) 30, a router 40, Internet subscriber terminal equipment 50, Internet subscriber equipment 60, a VoIP terminal 90, and a telephone or a facsimile machine (hereinafter, referred to as a telephone) 91.

The VoIP terminal 90 can be embedded in the Internet subscriber equipment 60 or can stand alone.

The call server 10 processes a signaling message switched through the VoIP network 20, and connects a call for voice communication in accordance with the VoIP between terminals. The router 40 routes a destination of a packet transmitted from the VoIP terminal 90 or the VoIP network 20, and transmits the packet received in accordance with the result of the routing.

The OSS 30 assigns an IP address to be used when the VoIP terminal 90 is connected to the VoIP network 20 in accordance with a Dynamic Host Configuration Protocol (DHCP), and assigns a domain name with which the corresponding VoIP terminal 90 can be identified in the VoIP network 20 in accordance with a Domain Name System (DNS). The OSS 30 manages the VoIP network 20 and all terminals or apparatus connected to the VoIP network 20 in accordance with a Simple Network Management Protocol (SNMP), and downloads a configuration file in accordance with a Trivial File Transfer Protocol (TFTP).

The Internet subscriber terminal equipment 50 changes cable data to an IP data packet. That is, the Internet subscriber terminal equipment 50 changes the IP data packet transmitted from the VoIP network 20 through the router 40 to cable data or telephone line data and transmits the data to the Internet subscriber equipment 60.

The Internet subscriber terminal equipment 50 changes the cable data transmitted from the VoIP terminal 90 through the cable to data packets and transmits the data packets to the router 40.

The Internet subscriber terminal equipment 50 can include a Cable Modem Termination System (CMTS) or a Digital Subscriber Line Access Multiplexer (DSLAM).

The Internet subscriber equipment 60 changes the cable data transmitted from the Internet subscriber terminal equipment 50 through the cable to IP data packets, and provides the VoIP terminal 90 with the data packets.

The subscriber equipment 60 can include the VoIP terminal 90 in a stand alone or embedded form, and the VoIP terminal 90 directly connects the telephone 91 to a PSTN 70 in accordance with user's selection and sets a call to a Switching Center 80.

The function with which the VoIP terminal 90 directly connects the telephone 91 to the PSTN 70 is referred to as a PSTN backup function.

That is, the VoIP terminal 90 provides the VoIP service by connecting the telephone 91 to the VoIP network 20, or provides an information message service (for example, weather, time, etc.) or an urgent communication service (for example, fire report, crime report, etc.) by connecting the telephone 91 to the PSTN 70, in accordance with the user's selection.

Figure 2:
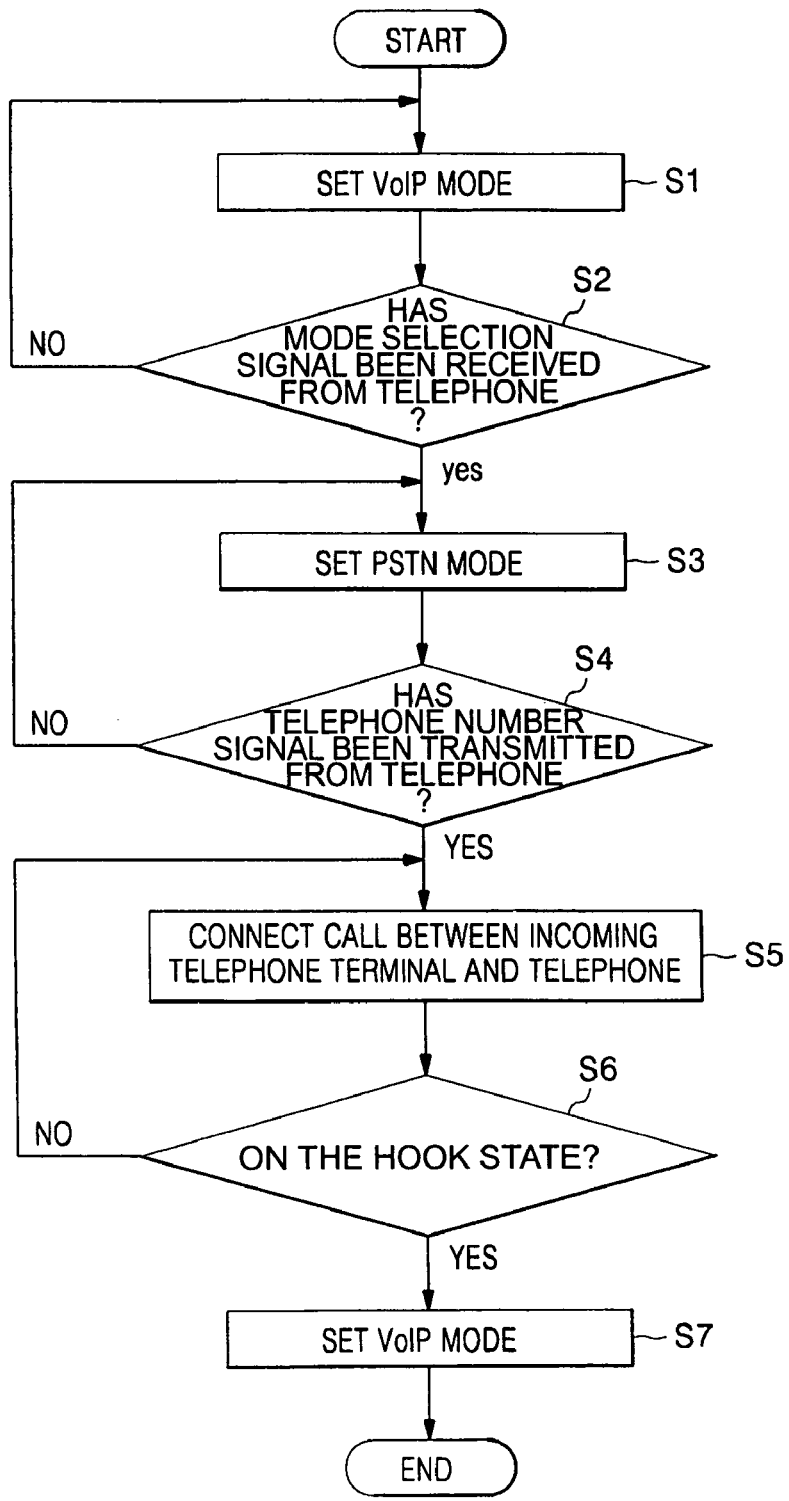
FIG. 2 is a flowchart of a VoIP terminal providing a PSTN backup function on a VoIP network.

FIG. 2 is flowchart of a VoIP terminal providing a PSTN backup function on a VoIP network.

Referring to FIG. 2, at first, a VoIP mode of the telephone 91 connected to the VoIP terminal 90 is set (S1).

Next, the VoIP terminal 90 determines whether or not a mode selection signal has been received from the telephone 91 by selecting a specific button of the telephone 91 set by a user (S2).

The specific button is defined in a configuration file downloaded from the OSS 30 when the VoIP terminal 90 is connected to the VoIP network 20.

As a result of the determination, the VoIP terminal 90 operates a relay switch to directly connect the telephone 91 to the Switching Center 80 through the PSTN 70 to set the PSTN mode when the mode selection signal has been received from the telephone 91 (S3).

The Switching Center 80 determines whether or not an incoming signal in accordance with the user's selection has been transmitted from the telephone 91 (S4). When the incoming signal has been received, the Switching Center 80 identifies an incoming phone terminal (not shown) and connects a call to effect voice communication between the corresponding incoming telephone terminal and the telephone 91 connected to the VoIP terminal 90 (S5).

The VoIP terminal 90 determines whether or not the telephone 91 or the incoming telephone terminal is on the hook when the user hangs up (S6), and sets the VoIP mode in which the telephone 91 is connected to the VoIP network 20 when the VoIP terminal 90 is on the hook (S7).

However, the above-noted method where the VoIP terminal 90 provides the PSTN back up function has the following problems.

Firstly, the user cannot be automatically provided with the information message service and urgent communication service from the Switching Center 80 through the telephone 91 connected to the VoIP terminal 90.

That is, the VoIP terminal 90 operates the relay switch and connects the telephone 91 to the Switching Center 80 only when the user selects a specific button and a mode selection signal is transmitted from the telephone 91.

When the VoIP terminal 90 connects the telephone 91 to the Switching Center 80, the Switching Center 80 recognizes that the telephone 91 is off the hook and transmits a dial tone.

Accordingly, there are problems in that the user has to listen for the dial tone transmitted from the Switching Center 80, again select a button which is used to request the information message service or the urgent communication service, and retransmit the request signal to the Switching Center 80.

Secondly, there is no function provided where the on the hook state is deferred for a predetermined time period in case an unexpected problem broke out while an urgent call requested by the user is made so that it is mandatory that the telephone be on the hook.

For example, it is required that even though the user necessarily leaves the telephone on the hook due to an unexpected reason while the user makes an urgent call, for example, a crime report, the VoIP terminal 90 defers the on the hook state for a predetermined time period so that the Switching Center 80 or the incoming party can grasp the state of the user. However, conventional methods did not consider the above.

Thirdly, the VoIP terminal 90 cannot detect a ring tone signal transmitted from the Switching Center 80 while the VoIP mode is set where the telephone 91 is connected to the VoIP network 20.

Accordingly, there is a problem that the PSTN line cannot be used while the VoIP is setting the VoIP mode.

Finally, in the PSTN mode where the VoIP terminal 90 connects the telephone 91 to the PSTN 70 in accordance with the user's selection, it is not possible to sense a state of the usage of the telephone 91, that is, the on the hook or off the hook state of the telephone 91.

An embodiment of the present invention is described below with reference to the accompanying drawings. In the following description, well-know functions or constructions are not described in detail since they would obscure the invention in unnecessary detail.

Hereinafter, a detailed description of the invention explains a VoIP terminal having 'DSP-SLAC (Subscriber Line Audio-processing Circuits)-SLIC (Subscriber Line Interface Circuits)' by way of an example, and five GPIO (General Purpose Input/Output) ports included in a general purpose DSP (Digital Signal Processing) chip and a separate switch are used, and a VoIP terminal as an example of an apparatus for providing a PSTN backup function. However, the PSTN backup function can also be provided using an apparatus such as another MTA (Multi Media Adapter) or E-MTA (Embedded-Multi Media Adapter).

Figure 3:
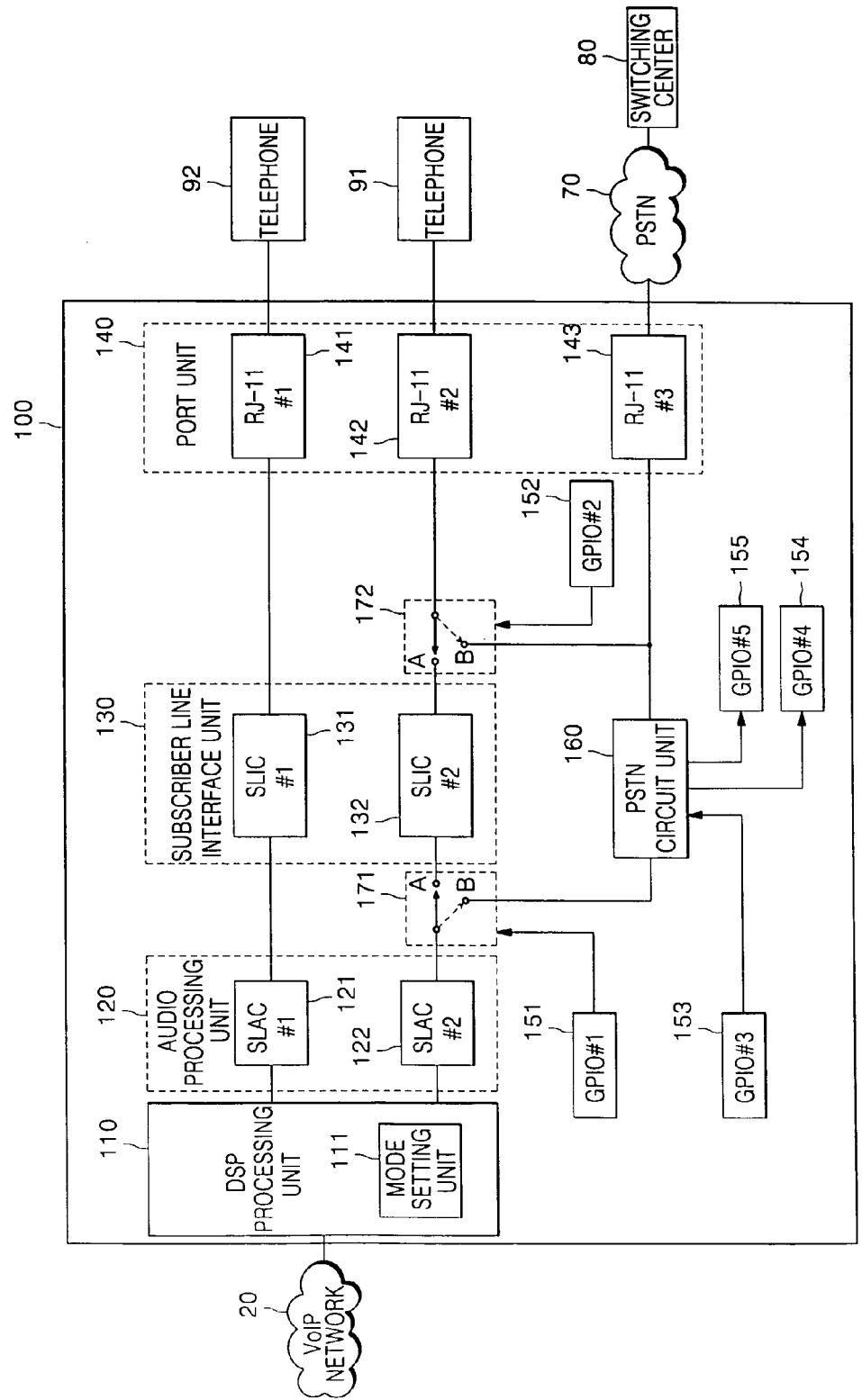
FIG. 3 is a detailed block diagram of an apparatus for providing a VoIP terminal with an automatic PSTN backup function in accordance with an embodiment of the present invention.

FIG. 3 is a detailed block diagram of an apparatus for providing an automatic PSTN backup function in accordance with an embodiment of the present invention.

Referring to FIG. 3, a VoIP terminal 100 adapted to provide the PSTN backup function includes a DSP processing unit 110, an audio processing unit 120, a subscriber line interface unit 130, a port unit 140, a PSTN circuit unit 160, and a plurality of GPIO ports 151-155.

The GPIO ports 151-155 are included in a general purpose DSP chip, which can transmit a control signal or receive a sensing signal or a detection signal.

That is, the GPIO #1 151 is a port with which the DSP processing unit 110 transmits a switching control signal to a first switching unit 171, the GPIO #2 152 is a port with which the DSP processing unit 110 transmits the switching signal to a second switching unit 172, and the GPIO #3 153 is a port with which the DSP processing unit 110 transmits the switching control signal to a third switching unit 173 included in the PSTN circuit unit 160.

The GPIO #4 154 is a port with which the DSP processing unit 110 receives a sensing signal transmitted from the PSTN circuit unit 160 with respect to the hook state of a telephone 90, and the GPIO #5 155 is a port with which the DSP processing unit 110 receives a ring tone detection signal transmitted from the PSTN circuit unit 160.

The port unit 140 connects the telephone 90 to a Switching Center 80 through a telephone line including a tip line and a ring line.

The port unit 140 can be comprised of a plurality of RJs (Registered Jack)-11.

Hereinafter, the detailed description of the present invention will explain a case where a telephone 92 connected to the RJ-11 #1 141 is a VoIP dedicated terminal, a telephone 91 connected to the RJ-11 #2 142 is connected to a multiple terminal which is connected to the VoIP network 70 and uses the VoIP service, or which is connected to the Switching Center 80 through the PSTN 70 and uses the PSTN service, and the Switching Center 80 is connected to the RJ-11 #3 143 through the PSTN 70.

The telephone 91 provides a selection signal in accordance with the subscriber's selection.

The subscriber line interface unit 130 interfaces a line of the telephone 91 connected through the port unit 140.

The subscriber line interface unit 130 can be comprised of a plurality of SLICs 131 and 132, preferably, SLICs 131 and 132 corresponding to a plurality of RJ-11 jacks 141 and 142, which interfaces each of the lines of the telephone 91 connected through the plurality of RJ-11 jacks 141 and 142.

The audio processing unit 120 converts an analog signal transmitted from the telephone 91 connected through the subscriber line interface unit 130 to a digital signal and transmits the digital signal to the DSP processing unit 110, and converts a digital signal transmitted from the DSP processing unit 110 to an analog signal and transmits the analog signal to the telephone 91 through the subscriber line interface unit 130.

When the analog signal is transmitted from the Switching Center 80 through the PSTN 70, the analog signal is converted to a digital signal and the converted digital signal is transmitted to the DSP processing unit 110.

The first switching unit 171 and the second switching unit 172 relay switches in accordance with switching control signals provided from the DSP processing unit 110 and set modes.

That is, the first switching unit 171 relays the switch from a terminal A to a terminal B in accordance with the switching control signal transmitted from the DSP processing unit 110 and connects the audio processing unit 120 to the PSTN circuit unit 160, or relays the switch from the terminal B to the terminal A and connects the audio processing unit 120 to the subscriber line interface unit 130.

The second switching unit 172 relays the switch from the terminal A to the terminal B in accordance with the switching control signal transmitted from the DSP processing unit 110 and connects the port unit 140 to the Switching Center through the PSTN 70, or relays the switch from the terminal B to the terminal A and connects the port unit 140 to the audio processing unit 120.

The PSTN circuit unit 160 detects whether or not the ring tone signal is transmitted from the Switching Center 80 connected through the PSTN 70, transmits the ring tone detection signal to the DSP processing unit 110, and transmits the ring tone signal to the Switching Center in accordance with the switching control signal transmitted from the DSP processing unit 110.

That is, the PSTN circuit unit 160 generates the tone signal in accordance with the switching control signal of the DSP processing unit 110, and transmits the signal to the Switching Center 80 through the PSTN 70.

The PSTN circuit unit 160 senses the hook state of the telephone line on which a call is connected between the Switching Center 80 and the telephone 91 in the state that the call is connected between the telephone 80 and the telephone 91, and transmits an on hook sensing signal to the DSP processing unit 110 when it is on the hook.

Figure 4:
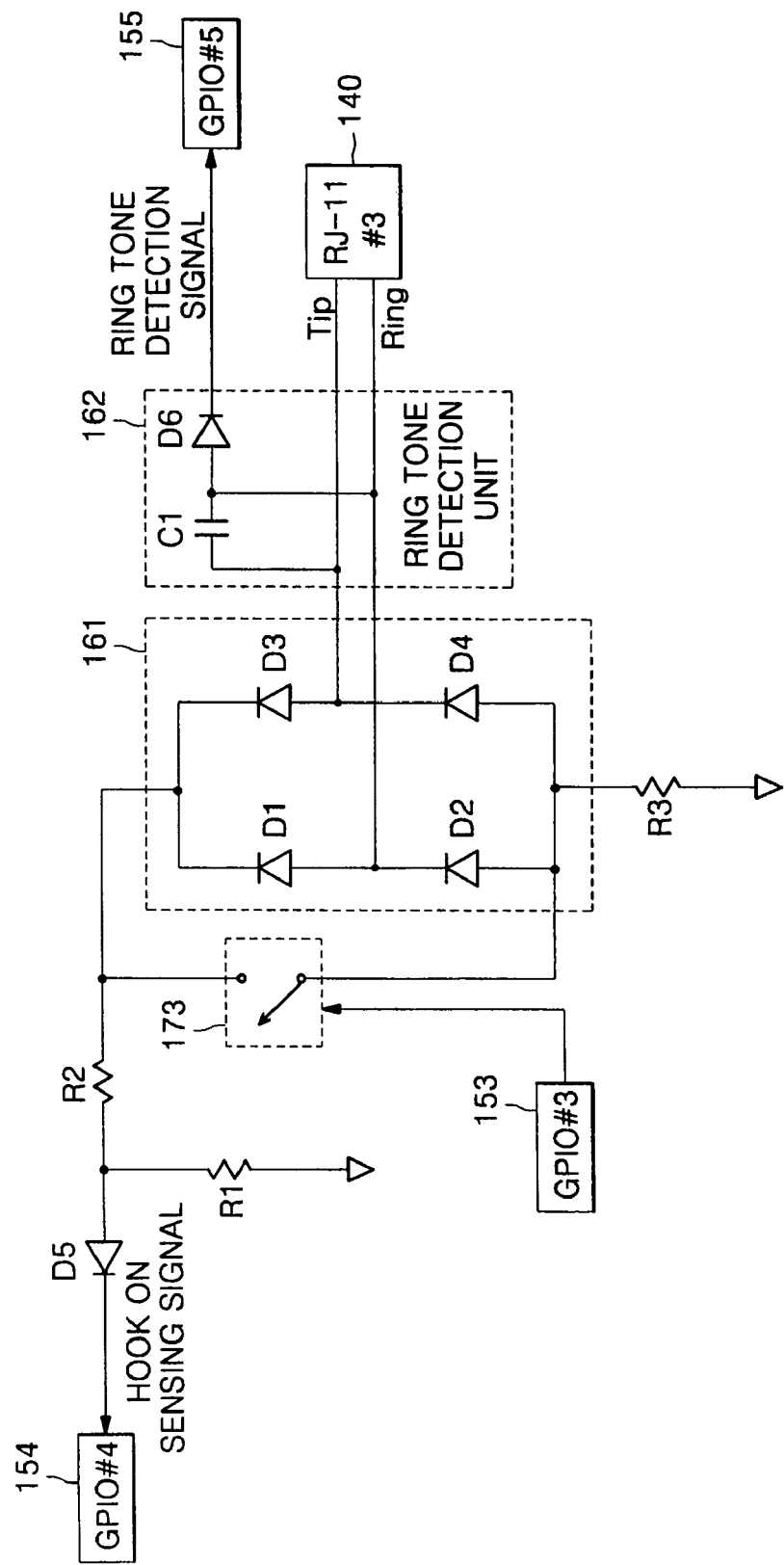
FIG. 4 is a circuit diagram of a PSTN circuit in accordance with an embodiment of the present invention.

FIG. 4 is a circuit diagram of a PSTN circuit unit in accordance with an embodiment of the present invention.

Referring to FIG. 4, the PSTN circuit unit 160 includes a third switching unit 173, a rectification unit 161, a ring tone detection unit 162, a plurality of resistors R1, R2 and R3, and a diode D5.

The rectification unit 161 can be comprised of bridge diodes. That is, a cathode terminal of a first diode D1 is connected to an anode terminal of a second diode D2, a cathode terminal of a third diode D3 is connected to an anode terminal of a fourth diode D4. The first and second diode pairs D1 and D2 are connected in parallel to the third and fourth diode pairs D3 and D4.

The rectification unit 161 rectifies an analog signal in order that the PSTN circuit unit 160 senses a hook state of the telephone line connected to the PSTN 70.

The plurality of resistors R1 and R2 are resistors with which the PSTN circuit unit 160 senses the hook state of the telephone line connected to the Switching Center 80 while the PSTN mode is set and transmits the sensed signal to the DSP processing unit 110.

That is, the PSTN circuit unit 160 generates an on hook sensing signal and transmits the signal to the DSP processing unit 110 when the telephone 91 or the Switching Center 80 terminates a call and senses that the telephone line is on the hook.

The ring tone detection unit 162 detects a ring tone signal transmitted from the Switching Center 80 in the state of VoIP mode, and transmits the ring tone signal to the DSP processing unit 110 when the ring tone signal is detected.

The ring tone detection unit 162 can be comprised of a capacitor C1 serially connected to the telephone line connected to the Switching Center 80, and a sixth diode D6 having its anode terminal connected to one terminal of the capacitor C1.

The third switching unit 173 forms a closed loop between the Switching Center 80 and the telephone 91 by making the telephone line open or closed in accordance with the switching control signal transmitted from the DSP processing unit 110, or generates a communication request signal which the Switching Center 80 can recognize.

The PSTN circuit unit 160 has a fifth diode D5 whose cathode terminal is connected to the GPIO#4 154, and the first and second resistors R1 and R2 which are serially connected to the anode terminal of the fifth diode D5.

One terminal of the second resistor R2 is serially connected to one terminal of the third switching unit 173, and one terminal of the third switching unit 173 is connected to one side of the rectification unit 161.

The other terminal of the third switching unit 173 is serially connected to the other terminal of the rectification unit 161, and the other terminal of the bridge diode 161 is serially connected to the third resistor R3.

One input terminal of the rectification unit 161 is connected to a tip line of the telephone line and the other input terminal is serially connected to a ring line of the telephone line.

Simultaneously, one terminal of the capacitor C1 of the ring tone detection unit 162 is serially connected to the tip line and the other terminal of the capacitor C1 is serially connected to an anode terminal of a sixth diode D6.

Also, the anode terminal of the sixth diode D6 is serially connected to the ring line.

The DSP processing unit 110 extracts a regular signal from signals transmitted from the telephone 91 and outputs the extracted regular signal to the VoIP network 70, or extracts a regular signal from signals transmitted from the VoIP network 70 and transmits the extracted regular signal to the telephone 91.

A mode setting unit 111 of the DSP processing unit 110 generates signals inputted through an input port, that is, the GPIO #4 154 and the GPIO #5 155 and a switching control signal in accordance with a mode change signal or a request signal transmitted from the telephone 91. The mode setting unit 111 transmits the generated switching control signal to each of the switching units 171 and 172 to set the mode.

That is, the mode setting unit 111 generates a first switching control signal to set the VoIP mode which connects the telephone 91 to the VoIP network 70 when the telephone 91 is connected to the mode setting unit through the RJ-11 #2 142 of the port unit 140, and transmits the generated signal to the first switching unit 171 through the GPIO #1 151 and to the second switching unit 172 through the GPIO #2 152.

The first switching unit 171 and the second switching unit 172 connect the telephone 91 to the VoIP network by connecting the switch to an terminal A when the first switching control signal is received.

The mode setting unit 111 determines whether or not a mode selection signal is received from the telephone 91 in the state that the VoIP mode is set, generates the second switching control signal to convert the VoIP mode to the PSTN mode in the case of reception, and transmits the generated signal to the first and second switching units 171 and 172.

The first switching unit 171 and the second switching unit 172 relay the switch from the terminal A to the terminal B and convert the VoIP mode to the PSTN mode when the second switching control signal is received.

The mode selection signal transmitted to the DSP processing unit 110 by the telephone 91 can be defined using a configuration file provided by the OSS 30 when the telephone 91 is connected to the VoIP network 70.

FIG. 5 is a view of a configuration file in accordance with an embodiment of the present invention.

Referring to FIG. 5, when the telephone 91 is connected to the VoIP network 70, a mode selection signal a, an urgent communication request signal b, and an information request signal c can be defined in a region R which is reserved in a configuration file provided by the OSS 30.

In accordance with an example, the mode selection signal a can be defined as "#" or '0000', the urgent communication request signal b can be defined as '110', '112' or '113', and the information request signal c can be defined as '1xx' or '116'.

The mode setting unit 111 generates the first switching control signal to convert the PSTN mode to the VoIP mode and transmits the generated signal to the first and second switching units 171 and 172 when a hook on sensing signal is transmitted from the PSTN circuit unit 160 in the state that the PSTN mode is set.

The first and second switching units 171 and 172 relay the switch from the terminal B to the terminal A and converts the PSTN mode to the VoIP mode when the switching units 171 and 172 receive the first switching control signal.

The mode setting unit 111 generates the second switching control signal to set the PSTN mode where the telephone 91 is connected to the PSTN and transmits the generated signal to the first and second switching units 171 and 172 when the ring tone detection signal is transmitted from the PSTN circuit unit 160 in the state that the VoIP mode is set. The mode setting unit 111 relays the switch from the terminal A to the terminal B and converts the VoIP mode to the PSTN mode when the switching units 171 and 172 receive the second switching control signal.

On the other hand, when the urgent communication request signal or the information request signal is transmitted from the telephone 91 in the state that the VoIP mode is set, the mode setting unit 111 transmits a control signal to the third switching unit 173 of the PSTN circuit unit 160, forms a closed loop between the Switching Center 80 and the telephone 91, and transmits the urgent communication request signal in accordance with a communication request signal or the information request signal to the Switching Center 80 through the PSTN 70.

The mode setting unit 111 determines whether the request signal transmitted from the telephone 91 is a mechanical type signal or an electronic type signal. In the case of the electronic type signal, an electronic communication request signal is generated from the DSP processing unit and transmitted to the telephone 80. In the case of the mechanical type signal, the third switching control signal is transmitted to the third switching unit 173.

The third switching unit 173 generates the communication request signal by making the switch open or closed in accordance with the third switching control signal transmitted from the mode setting unit 111 and transmits the signal to the telephone 80.

Figure 6:
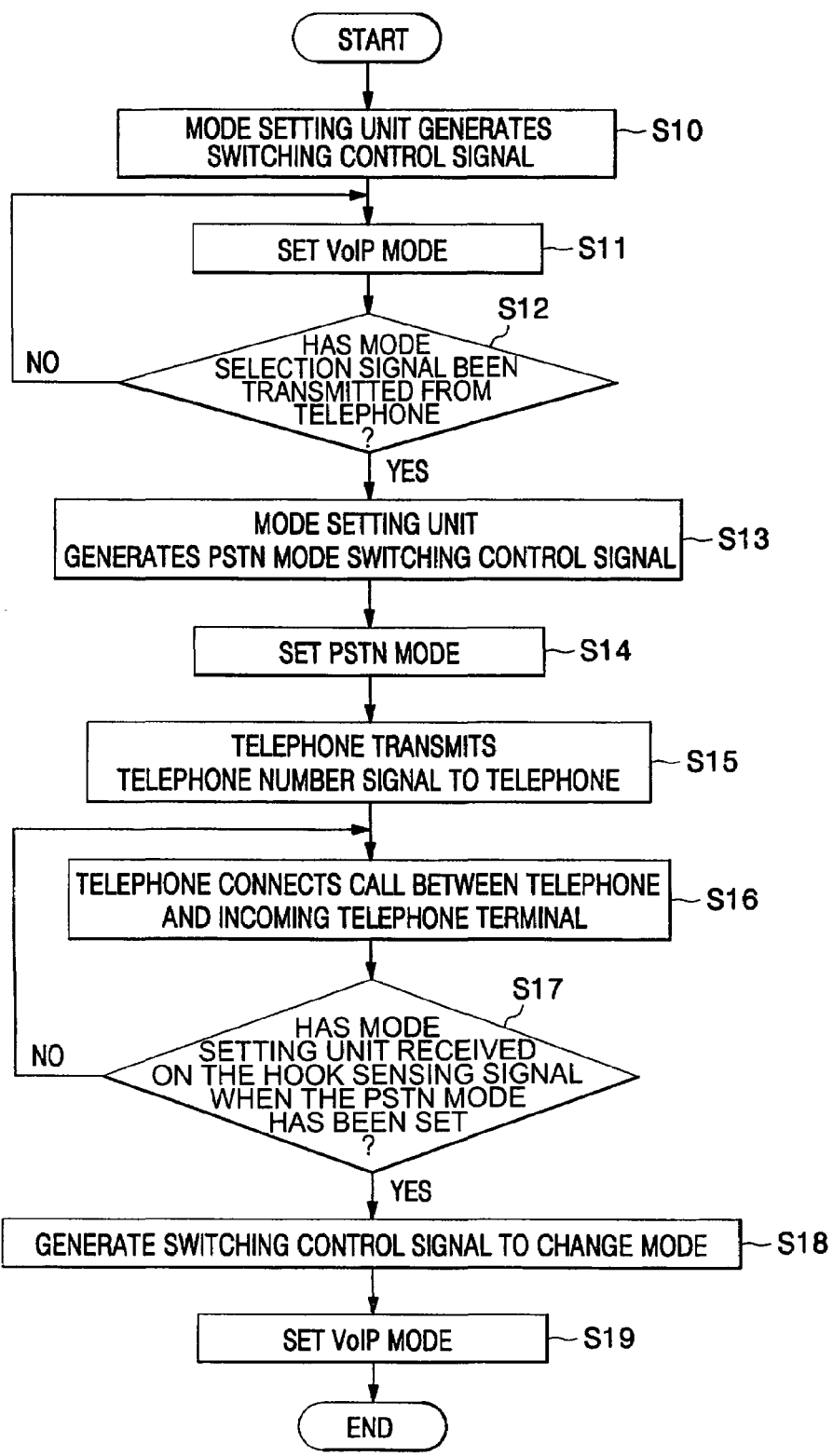
FIG. 6 is a flowchart of a PSTN backup function in accordance with an embodiment of the present invention.

FIG. 6 is a flowchart of a PSTN backup function in accordance with an embodiment of the present invention.

Referring to FIG. 6, firstly, the mode setting unit 111 of the DSP processing unit 110 generates a first switching control signal to set the VoIP mode and transmits the control signal to the first and second switching units 171 and 172 through the GPIO #1 151 and the GPIO #2 152 when the mode setting unit 111 is connected to the telephone 91 through the port unit 140 (S10).

The first and second switching units 171 and 172 connect the switch to the terminal A to set the VoIP mode where the telephone 91 is connected to the VoIP network 20 when the first switching control signal is transmitted from the mode setting unit 111 (S11).

The mode setting unit 111 determines whether or not the mode selection signal has been transmitted from the telephone 91 in the state that the VoIP mode has been set (S12).

That is, the user selects the '#' or '0000' mode selection button defined in the configuration file downloaded from the OSS 30 and determines whether or not the mode selection signal has been received from the telephone 91. When the mode selection signal has been received, the mode setting unit 111 generates the second switching control signal to set the PSTN mode and transmits the control signal to the first and second switching units 171 and 172 through the GPIO #1 151 and the GPIO #2 152 (S13).

The first and second switching units 171 and 172 change the position of the switch from terminal A to terminal B to set the PSTN mode in response to the second switching control signal being transmitted from the mode setting unit 111 (S14).

If the user has selected the mode selection button and the mode setting unit 111 has set the PSTN mode, then the telephone 91 generates a telephone number signal in accordance with the user's selection, and transmits it to the Switching Center 80 through the PSTN 70 (S15).

The Switching Center 80 connects a call between an incoming telephone terminal and the telephone 91 in accordance with the telephone number signal transmitted from the telephone 91, (S16).

The mode setting unit 111 determines whether or not the on the hook sensing signal has been received from the PSTN circuit unit 160 when the PSTN mode has been set (S17).

That is, the PSTN circuit unit 160 senses the hook state of the telephone line when the mode setting unit 111 has set the PSTN mode and a closed loop is formed between the telephone 91 and the Switching Center 80. When the user places the handset of the telephone 91 on the hook or the incoming telephone terminal and the telephone line is on the hooked, the on the hook sensing signal is transmitted to the mode setting unit 111 through the GPIO #4 154.

When the mode setting unit 111 receives the on hook sensing signal, it generates the first switching control signal to convert from the PSTN mode to the VoIP mode and transmits the control signal to the first and second switching units 171 and 172 through the GPIO #1 151 and the GPIO #2 152 (S18).

The first and second switching units 171 and 172 change the position of the switch from the terminal B to the terminal A and convert from the PSTN mode to the VoIP mode when the first switching control signal is transmitted from the mode setting unit 111 (S19).

Figure 7A:
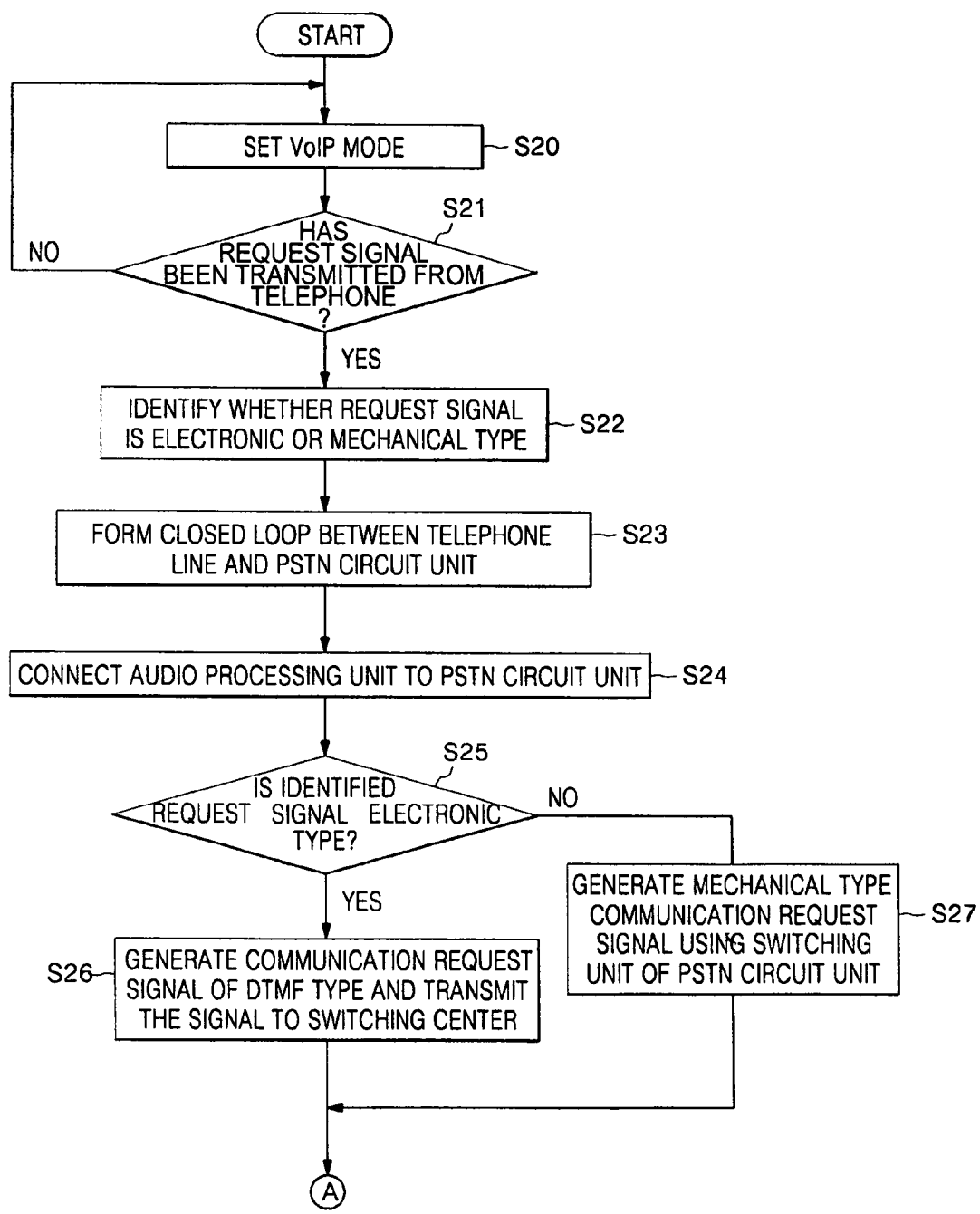
FIGS. 7A and 7B are flowcharts of a method of providing a PSTN backup function in accordance with another embodiment of the present invention.
Figure 7B:
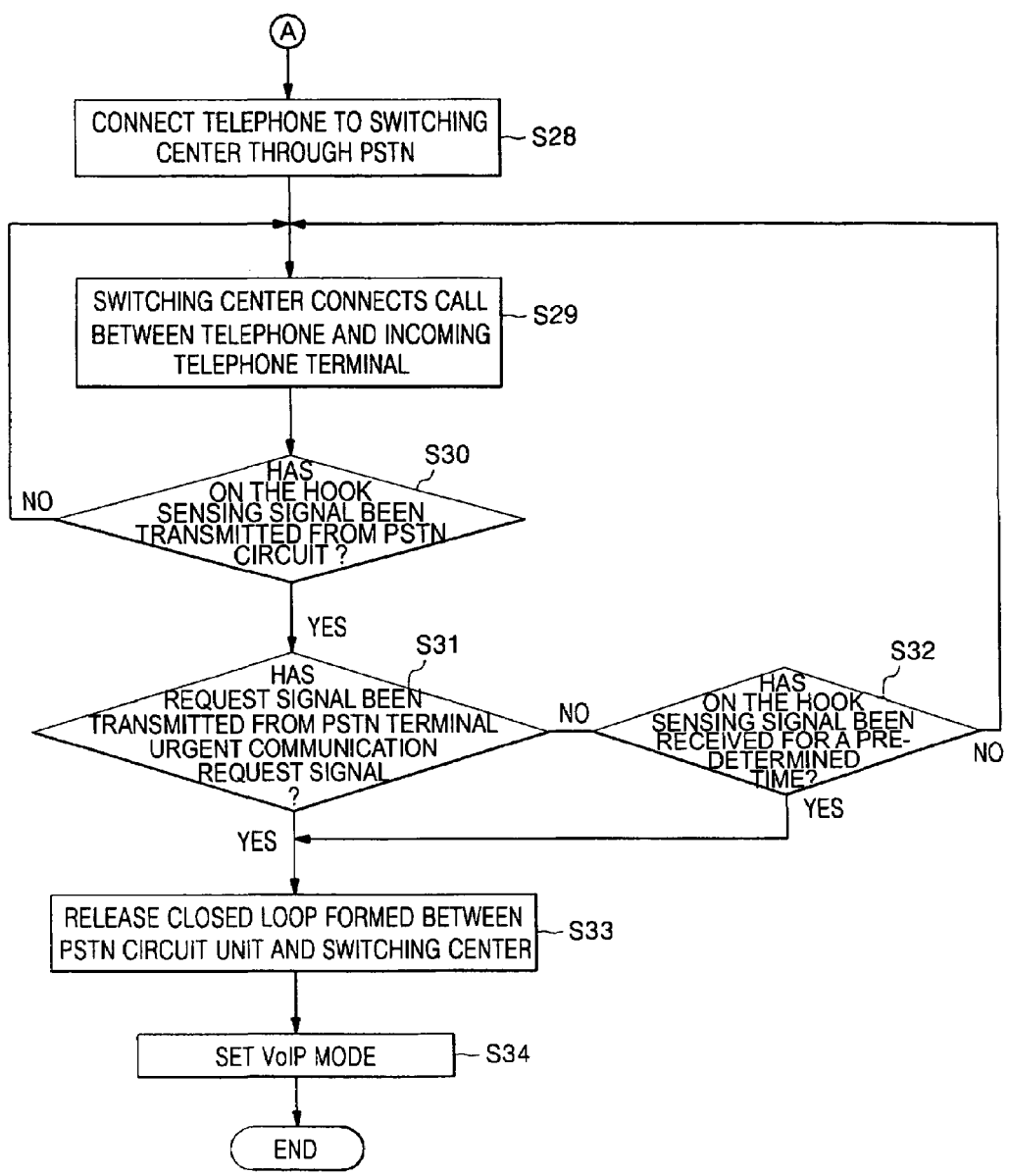

FIGS. 7A and 7B are flowcharts of a method of providing a PSTN backup function in accordance with another embodiment of the present invention.

Referring to FIGS. 7A and 7B, when the telephone 91 is connected through the port 8 unit 140, the mode setting unit 111 generates the first switching control signal used to set the VoIP mode connecting the telephone 91 to the VoIP network 20, and transmits the control signal to the first and second switching units 171 and 172 through the GPIO #1 151 and the GPIO #2 152.

The first and second switching units 171 and 172 connect the switch to terminal A to set the VoIP mode in response to the first switching control signal transmitted from the mode setting unit 111 (S20).

The mode setting unit 111 periodically determines if the ring tone detection signal or the sensing signal has been transmitted from the PSTN circuit unit 160 when the telephone 91 is connected to the mode setting unit 111.

The mode setting unit 111 determines if an urgent communication request signal or an information request signal has been transmitted from the telephone 91 (S21).

That is, the mode setting unit 111 determines if the urgent communication request signal or the information request signal has been transmitted from the telephone 91 when the user selects an urgent communication request button, '110', '112' or '113', or an information request button, '1xx' or '116'. If there is a transmission, then the mode setting unit 111 determines if the urgent communication request signal or the information request signal is a mechanical type signal or an electronic type signal (S22).

The mode setting unit 111 determines the request signal to be the mechanical type signal when the request signal transmitted from the telephone 91 is received within a predetermined time from when the mechanical type signal is received, and determines the request signal to be the electronic type signal when the request signal is a dual-tone multi-frequency (DTMF) type signal.

The mode setting unit 111 generates the third switching control signal and transmits the signal to the third switching unit 173 in order to form a closed loop between the telephone line and the PSTN circuit unit 160 (S23).

The third switching unit 173 closes the switch and makes the PSTN circuit unit 160 and the Switching Center into a closed loop through the telephone line when the third switching control signal has been received from the mode setting unit 111.

The mode setting unit 111 generates the first switching control signal to set the PSTN mode and transmits the signal to the first switching unit 171 through the GPIO #1 151 (S24).

The first switching unit 171 changes the position of the switch from terminal A to terminal B when the first switching control signal has been transmitted from the mode setting unit 111.

The mode setting unit 111 determines the type of request signal transmitted from the telephone 91 (S25). When the request signal is determined to be the electronic type signal, the mode setting unit 111 generates a communication request signal of the DTMF type in response to the request signal transmitted form the telephone 91 and transmits a communication request signal to the SLAC #2 122 of the audio processing unit 120 (S26).

The SLAC #2 122 converts the communication request signal of the DTMF type transmitted from the mode setting unit 111 to an analog signal and transmits the analog signal to the Switching Center 80 through the first switching unit 171.

That is, the SLAC #2 122 transmits the analog signal through terminal B of the first switching unit 171 and the PSTN circuit unit 160 transmits the analog signal received through terminal B of the first switching unit 171 to the Switching Center 80 through the third switching unit 173 and the rectification unit 161.

On the other hand, the mode setting unit 111 generates the third switching control signal to control the third switching unit 173 in response to the request signal transmitted from the telephone 91 when the request signal is the mechanical type signal and transmits the control signal to the third switching unit 173 through the GPIO #3 153 (S27).

That is, the mode setting unit 111 generates the third switching control signal to generate the mechanical type communication request signal in response to the request signal transmitted from the telephone 91.

The third switching unit 173 repeatedly opens and closes the switch in response to the third switching control signal transmitted from the mode setting unit 111 and generates the communication request signal so that the Switching Center 80 senses the communication request signal.

The mode setting unit 111 transmits the communication request signal in response to the request signal transmitted from the telephone 91 to the Switching Center 80, generates the second switching control signal to set the PSTN mode, and transmits the signal to the second switching unit 172 through the GPIO #2 152 (S28).

The second switching unit 172 changes the position of the switch from terminal A to terminal B when the second switching control signal has been received from the mode setting unit 111.

The Switching Center 80 identifies an incoming telephone terminal (not shown) of the communication request signal transmitted through the PSTN 70 and transmits the communication request signal to the corresponding incoming telephone terminal. When the incoming telephone terminal responds to the communication request signal, the Switching Center 80 connects the call between the telephone 91 and the incoming telephone terminal (S29).

The mode setting unit 111 sets the PSTN mode, and determines whether or not the on the hook sensing signal has been received from the PSTN circuit unit 160 (S30).

That is, the PSTN circuit unit 160 senses the hook state of the telephone line when the PSTN mode is set, and outputs the on hook sensing signal through the GPIO #4 154 when the telephone line is on the hook.

The mode setting unit 111 determines whether or not the request signal transmitted from the telephone 91 is an urgent communication request signal when the on the hook sensing signal has been received from the PSTN circuit unit 160 (S31).

As a result of the determination, if the request message transmitted from the telephone 91 is an urgent communication request signal, then the mode setting unit 111 determines whether or not the on hook sensing signal transmitted from the PSTN circuit unit 160 has been received for a predetermined time (S32).

A determination that the mode setting unit 111 has received the on hook sensing signal for a predetermined time determines that the on the hook state has occurred due to some unavoidable circumstances during urgent communication through the Switching Center 80, by transmitting an urgent communication request through the telephone 91.

As a result of the determination, the mode setting unit 111 defers the on the hook state to maintain the call connection state between the telephone 91 and the incoming telephone terminal when the on the hook sensing signal has not been received for the predetermined time (S29).

On the other hand, as a result of the determination, if the communication request signal transmitted from the telephone 91 is not an urgent communication request signal, or the on the hook sensing signal has been received for the predetermined time even though the communication request signal is an urgent communication request signal, then the mode setting unit 111 generates the third switching control signal and transmits the generated third switching control signal to the third switching unit 173 through the GPIO #3 153 in order to release the closed loop formed between the PSTN circuit unit 160 and the Switching Center 80 (S33).

The mode setting unit 111 generates the first switching control signal to convert from the PSTN mode to the VoIP mode, and transmits the control signal to the first and second switching units 171 and 172 through the GPIO #1 151 and the GPIO #2 152 (S34).

The first and second switching units 171 and 172 change the position of the switch from terminal B to terminal A to set the VoIP mode when the first switching control signal has been received from the mode setting unit 111.

Figure 8:
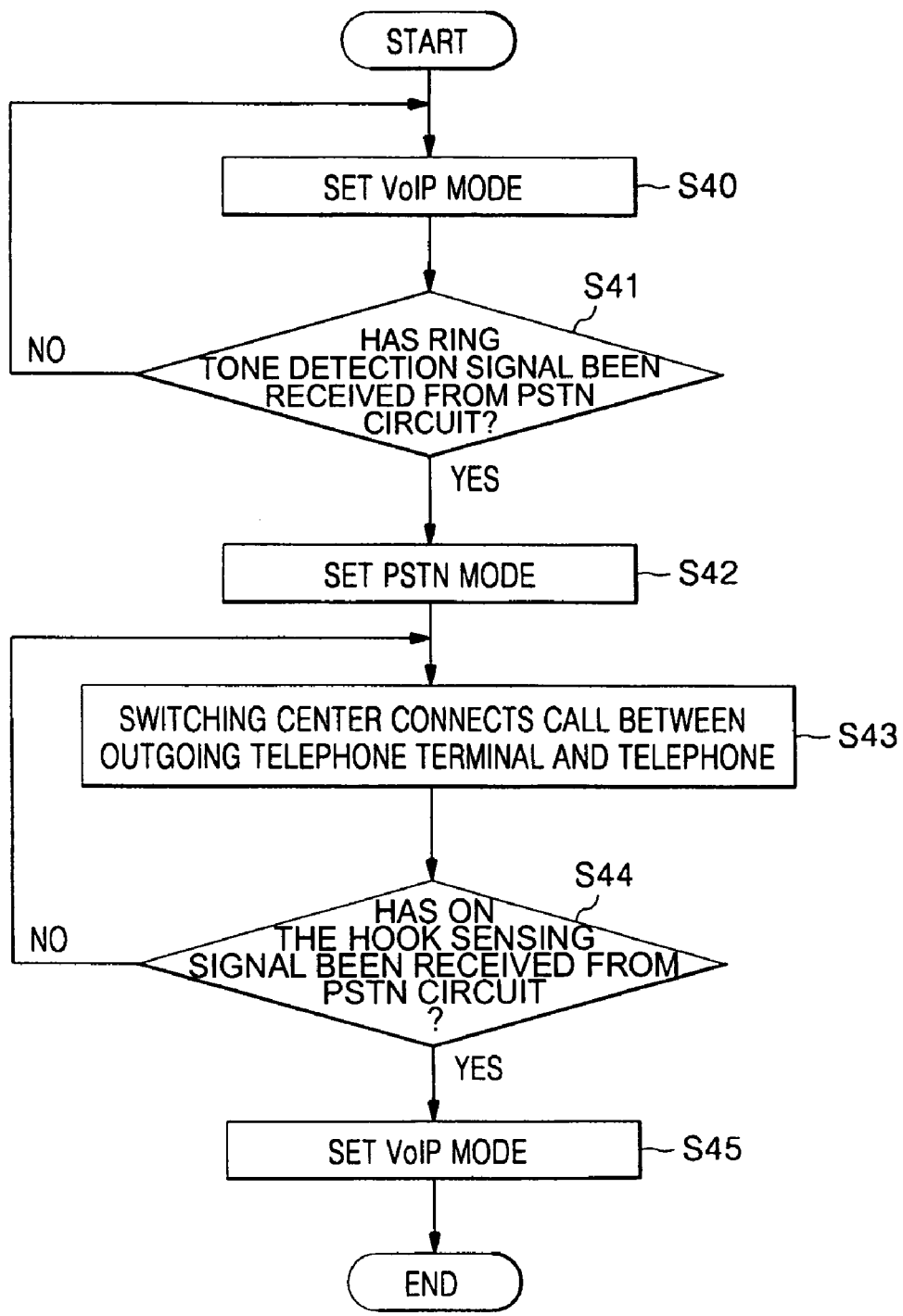
FIG. 8 is a flowchart of a method of providing a PSTN backup function in accordance with still another embodiment of the present invention.

FIG. 8 is a flowchart of a method of providing a PSTN backup function in accordance with another embodiment of the present invention.

Referring to FIG. 8, when the telephone 91 is connected through the port unit 140, the mode setting unit 111 generates the first switching control unit to set the VoIP mode connecting the telephone 91 to the VoIP network 20, and transmits the control signal to the first and second switching units 171 and 172 through the GPIO #1 151 and the GPIO #2 152. The first and second switching units 171 and 172 connect the switch to the terminal A and set the VoIP mode when the first switching control signal has been transmitted from the mode setting unit 111 (S40).

The mode setting unit 111 periodically determines if the ring tone detection signal or the sensing signal has been transmitted from the PSTN circuit unit 160 when the telephone 91 is connected.

The mode setting unit 111 determines whether or not the ring tone detection signal has been received from the PSTN circuit unit 160 in the state that the VoIP mode is set (S41).

That is, the PSTN circuit unit 160 detects the ring tone transmitted to the Switching Center 80 through the telephone line connected to the Switching Center 80 and outputs the ring tone detection signal through the GPIO #5 155.

The mode setting unit 111 periodically determines whether or not the ring tone detection signal has been transmitted through the GPIO #5 155.

The mode setting unit 111 generates the second switching control signal to set the PSTN mode and transmits the control signal to the first and second units 171 and 172 through the GPIO #1 151 and the GPIO #2 152, when the ring tone detection signal has been outputted through the GPIO #5 155 by the PSTN circuit unit 160 (S42).

The first and second switching units 171 and 172 change the position of the switch from terminal A to terminal B to set the PSTN mode when the second switching control signal has been received from the mode setting unit 111.

It is desirable for the period that the mode setting unit 111 determines the ring tone detection signal from the PSTN circuit unit 160 to be less than that of the ring tone signal transmitted from the Switching Center 80 by the desired rate.

That is, it is desirable that the mode setting unit 111 determines the ring tone detection signal outputted from the PSTN circuit unit 160 and generates the second switching control signal to set the PSTN mode, and the mode setting unit 111 sets a period of confirming the ring tone detection signal so as to make the total time to set the PSTN mode by the first and second switching units 171 and 172 shorter than the time when the telephone 91 correctly determines that the ring tone signal has been received from the Switching Center 80.

When the telephone 91 responds to the ring tone signal transmitted from the Switching Center 80, the Switching Center 80 connects a call between an outgoing telephone terminal (not shown) and the telephone 91 (S43).

Also, the mode setting unit 111 determines whether or not the on hook sensing signal has been received from the PSTN circuit unit 160 when the PSTN mode has been set (S44).

That is, the PSTN circuit unit 160 senses the hook state of the telephone line between the telephone 91 and the Switching Center 80 and outputs the on hook sensing signal through the GPIO #4 154 when the telephone is on the hook.

The mode setting unit 111 generates the first switching control signal to set the VoIP mode and transmits the control signal to the first and second switching units 171 and 172 through the GPIO #1 151 and the GPIO #2 152, when the on hook sensing signal has been transmitted from the PSTN circuit unit 160 (S45).

The first and second switching units 171 and 172 change the position of the switch from terminal B to terminal A to set the VoIP mode when the first switching control signal has been received from the mode setting unit 111.

Although exemplary embodiments of the present invention have been disclosed for illustrative purposes, those skilled in the art appreciate that various modifications, additions and substitutions are possible, without departing from the scope and spirit of the present invention as recited in the accompanying claims.

The advantages of the present invention are as follows.

First, a telephone connected to a VoIP terminal can be automatically provided with an information message service and an urgent communication service from a Switching Center through a PSTN.

Second, even in the case that the telephone is on the hook due to unexpected circumstances of a user or VoIP terminal while the telephone connected to the VoIP terminal performs the urgent communication service, the on the hook state can be deferred for a predetermined time.

Third, even when the telephone connected to the VoIP terminal is connected to the VoIP network, a call can be connected through the PSTN by detecting the ring tone signal transmitted from the Switching Center.

Fourth, the telephone connected to the VoIP terminal senses the on the hook state of the VoIP terminal when the telephone is connected to the PSTN, and can be automatically connected to the VoIP network when the VoIP terminal is on the hook.

What is claimed is:

1. A Voice over Internet Protocol (VoIP) terminal comprising:
   a line interface unit adapted to interface a line connected to a telephone terminal;
   an audio processing unit adapted to convert and process a signal switched between the telephone terminal connected through the line interface unit and a VoIP network;
   a mode setting unit adapted to provide a request signal transmitted from the telephone terminal, a mode change signal in accordance with a communication state of a line connected to a Public Switched Telephone Network (PSTN), and a dial control signal to generate a communication request signal in accordance with the type of request signal;
   a PSTN circuit unit adapted to provide a communication termination sensing signal in accordance with the communication state of the line connected to the PSTN, to generate the communication request signal in accordance with the dial control signal from the mode setting unit and to transmit the request signal to the PSTN;
   a first switching unit adapted to connect the audio processing unit to one of the line interface unit and the PSTN circuit unit in accordance with the mode change signal from the mode setting unit; and
   in accordance with the mode change signal from the mode setting units a second switching unit adapted to connect the line connected to the telephone terminal to one of the line interface unit and the PSTN,
   wherein the VoIP terminal while connected to the VoIP network is automatically provided with a PSTN backup function in which an on the hook state of the telephone terminal is deferred for a predetermined time period even when the on the hook state is required to be performed while a user is engaged in communications,
   wherein a ring tone signal transmitted from a PSTN can be detected even when the telephone terminal connected to the VoIP terminal is in a VoIP mode state and simultaneously, the telephone terminal connected to the VoIP terminal senses the hook state of the telephone terminal while in communication with the PSTN, and can be automatically connected to the VoIP network upon the VoIP terminal being placed on a hook.

2. The VoIP terminal according to claim 1, further comprising:
   a port unit adapted to connect the telephone terminal to one of the line interface unit and the PSTN through the telephone line; and
   a signal processing unit adapted to extract regular signals from signals transmitted from one of the telephone terminal and the VoIP network.

3. The VoIP terminal according to claim 1, wherein the mode setting unit is adapted to determine whether a request signal transmitted from the telephone terminal is a mechanical request signal or an electronic request signal in accordance with a receiving time, and to generate the dial control signal in accordance with the determined type of request signal.

4. The VoIP terminal according to claim 1, wherein the PSTN circuit unit comprises a third switching unit adapted to enable a Switching Center to sense the communication request signal by connecting a line to the Switching Center via the PSTN in accordance with whether the dial control signal is ON or OFF.

5. The VoIP terminal according to claim 1, wherein the mode setting unit is adapted to provide a switching control signal to control the first switching unit, to transmit a dial control signal to the PSTN circuit unit, and to provide a switching control signal to control the second switching unit, upon the request signal being transmitted from the telephone terminal.

6. The VoIP terminal according to claim 1, wherein the mode setting unit is adapted to determine whether or not the request signal transmitted from the telephone terminal is an urgent communication request signal upon a communication termination sensing signal being transmitted from the PSTN circuit unit, and to delay the communication termination state of the line for a predetermined time period upon the request signal being an urgent communication request signal.

7. The VoIP terminal according to claim 1, wherein the audio processing unit is adapted to transform a digital signal transmitted from the VoIP network to an analog signal and to transmit the transformed analog signal to the telephone terminal via the line interface unit.

8. The VoIP terminal according to claim 1, wherein the mode setting unit is adapted to provide the first switching control signal connecting the telephone terminal to the VoIP network upon the telephone terminal being connected through the port unit, and the second switching control signal connecting the telephone terminal to the PSTN upon a mode selection signal being transmitted from the telephone terminal.

9. The VoIP terminal according to claim 1, wherein the first switching unit is adapted to connect the audio processing unit to the line interface unit upon the first switching control signal being provided from the mode setting unit and to connect the audio processing unit to the PSTN circuit unit upon the second switching control signal being provided.

10. The VoIP terminal according to claim 1, wherein the first and second switching units comprise relay switches.

11. The VoIP terminal according to claim 1, wherein the mode setting unit is adapted to provide the first switching control signal and to connect the telephone terminal to the PSTN upon the mode selection signal being transmitted from the telephone terminal and the communication sensing signal being transmitted from the PSTN circuit and the telephone terminal being connected to the VoIP network.

12. A Voice over Internet Protocol (VoIP) terminal comprising:
   a line interface unit adapted to interface a line connected to a telephone terminal;
   an audio processing unit adapted to process and convert an analog signal transmitted from the telephone terminal via the line interface unit into a digital signal;
   a Public Switched Telephone Network (PSTN) circuit unit adapted to provide a ring tone detection signal by detecting a communication termination sensing signal in accordance with a communication state of a line connected to a PSTN and a ring tone signal transmitted from the PSTN;

a mode setting unit adapted to provide a PSTN switching control signal connecting the PSTN to the telephone terminal upon the ring tone detection signal being provided by the PSTN circuit, and to provide a VoIP switching control signal upon the communication termination sensing signal being provided;

a first switching unit adapted to connect the audio processing unit to the PSTN circuit unit in accordance with a PSTN switching control signal provided by the mode setting unit, and to connect the audio control unit to the line interface unit in accordance with the VoIP switching control signal; and a second switching unit adapted to connect the telephone terminal to the PSTN in accordance with the PSTN switching control signal provided by the mode setting unit, to transmit the ring tone signal to the telephone terminal, and to connect the telephone terminal to the line interface unit in accordance with the VoIP switching control signal, wherein the VoIP terminal while connected to a VoIP network is automatically provided with a PSTN backup function in which an on the hook state of the telephone terminal is deferred for a predetermined time period even when the on the hook state is required to be performed while a user is engaged in communications, wherein a ring tone signal transmitted from a PSTN can be detected even when the telephone terminal connected to the VoIP terminal is in a VoIP mode state and simultaneously, the telephone terminal connected to the VoIP terminal senses the hook state of the telephone terminal while in communication with the PSTN, and can be automatically connected to the VoIP network upon the VoIP terminal being placed on a hook.

13. The VoIP terminal according to claim 12, further comprising:

a port unit adapted to connect the telephone terminal to the line interface unit and the PSTN via a telephone line; and a signal processing unit adapted to extract regular signals from signals transmitted from one of the telephone terminal and the VoIP network.

14. A method comprising:

connecting a telephone terminal via a telephone line to a Voice over Internet Protocol (VoIP) network;

transmitting a communication request signal including telephone number information transmitted from the telephone terminal in accordance with a subscriber's selection to a Switching Center via a Public Switched Telephone Network (PSTN);

connecting the telephone terminal to the Switching Center via the PSTN;

sensing a communication state of a communication call upon the telephone terminal setting the communication call to exchange a voice signal via the PSTN; and connecting the telephone terminal to the VoIP network upon the communication state being terminated, wherein the VoIP terminal while connected to the VoIP network is automatically provided with a PSTN backup function in which an on the hook state of the telephone terminal is deferred for a predetermined time period even when the on the hook state is required to be performed while a user is engaged in communications, wherein a ring tone signal transmitted from a PSTN can be detected even when the telephone terminal connected to the VoIP terminal is in a VoIP mode state and simultaneously, the telephone terminal connected to the VoIP terminal senses the hook state of the telephone terminal while in communication with the PSTN, and can be automatically connected to the VoIP network upon the VoIP terminal being placed on a hook.

15. The method according to claim 14, further comprising:

sensing whether or not a ring tone signal has been received via the PSTN upon the telephone terminal being connected to the VoIP network; and connecting the telephone terminal to the PSTN upon the ring tone signal being received.

16. The method according to claim 14, further comprising:

determining whether or not the telephone number information included in the communication request signal transmitted from the telephone terminal is urgent communication number information upon the communication call set in the telephone terminal being in a communication termination state; and deferring the communication termination state of the telephone terminal for a predetermined time period upon the telephone number information being determined to be the urgent communication number information.

17. The method according to claim 14, wherein transmitting the communication request signal includes determining if the communication request signal transmitted from the telephone terminal is a mechanical signal or an electronic signal, and includes controlling connection of the communication line connected to the PSTN and transmitting the communication request signal upon the communication request signal being a mechanical signal, and transmitting a Dial Tone Multi Frequency (DTMF) communication request signal upon the communication request signal being an electronic signal.

18. A method comprising:

setting a Voice over Internet Protocol (VoIP) mode to connect a telephone terminal to a VoIP network;

enabling a line sensing apparatus to provide a ring tone detection signal upon a ring tone signal being transmitted from a Public Switched Telephone Network (PSTN) upon the VoIP mode being set; and setting a PSTN mode to connect the telephone terminal to the PSTN upon the ring tone detection signal being provided, wherein the telephone terminal while connected to a VoIP network is automatically provided with a PSTN backup function in which an on the hook state of the telephone terminal is deferred for a predetermined time period even when the on the hook state is required to be performed while a user is engaged in communications, wherein the ring tone signal transmitted from a PSTN can be detected even when the telephone terminal connected to a VoIP terminal is in a VoIP mode state and simultaneously, the telephone terminal connected to the VoIP terminal senses the hook state of the telephone terminal while in communication with the PSTN, and can be automatically connected to the VoIP network upon the VoIP terminal being placed on a hook.

19. The method according to claim 18, further comprising:

enabling a call to be connected between the telephone terminal and an outgoing telephone terminal via the PSTN by enabling the telephone terminal to respond to the ring tone signal transmitted to the PSTN;

enabling the line sensing apparatus to provide a communication termination sensing signal in accordance with a communication state of the line upon the PSTN mode being set; and releasing the PSTN mode and setting the VoIP mode upon the communication termination sensing signal being sensed by the line sensing apparatus.

20. A method comprising:

setting a Voice over Internet Protocol (VoIP) mode to connect a telephone terminal to a VoIP network upon the telephone terminal being connected;

transmitting a communication request signal to a Public Switched Telephone Network (PSTN) upon the communication request signal being transmitted from the telephone terminal;

setting a PSTN mode connecting the telephone terminal to the PSTN, and sensing a communication state of a line connected to the telephone terminal and the PSTN; and releasing the PSTN mode and setting the VoIP mode upon the communication state of the line being in a communication termination state, wherein the telephone terminal while connected to a VoIP network is automatically provided with a PSTN backup function in which an on the hook state of the telephone terminal is deferred for a predetermined time period even when the on the hook state is required to be performed while a user is engaged in communications, wherein the ring tone signal transmitted from a PSTN can be detected even when the telephone terminal connected to a VoIP terminal is in a VoIP mode state and simultaneously, the telephone terminal connected to the VoIP terminal senses the hook state of the telephone terminal while in communication with the PSTN, and can be automatically connected to the VoIP network upon the VoIP terminal being placed on a hook.

* * * * *

UNITED STATES PATENT AND TRADEMARK OFFICE
CERTIFICATE OF CORRECTION

PATENT NO.       : 7,636,429 B2                                   Page 1 of 1
APPLICATION NO.  : 11/002220
DATED            : December 22, 2009
INVENTOR(S)      : Jae-Hwan Kwak It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1418 days.

Signed and Sealed this

Twenty-first Day of December, 2010

David J. Kappos
*Director of the United States Patent and Trademark Office*